Jan. 19, 1971 E. M. LUSTIG 3,555,787
AIR PURIFYING AND HUMIDITY CONTROL SYSTEM
Filed Aug. 26, 1968 2 Sheets-Sheet 1

INVENTOR
EDUARD M. LUSTIG
BY Beale and Jones
ATTORNEYS

Jan. 19, 1971     E. M. LUSTIG     3,555,787
AIR PURIFYING AND HUMIDITY CONTROL SYSTEM
Filed Aug. 26, 1968     2 Sheets-Sheet 2
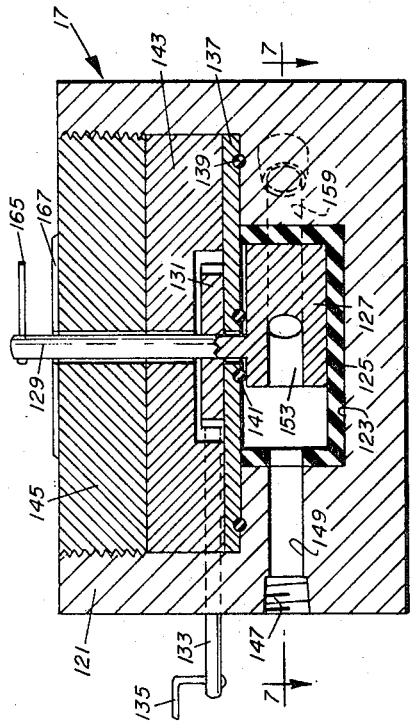
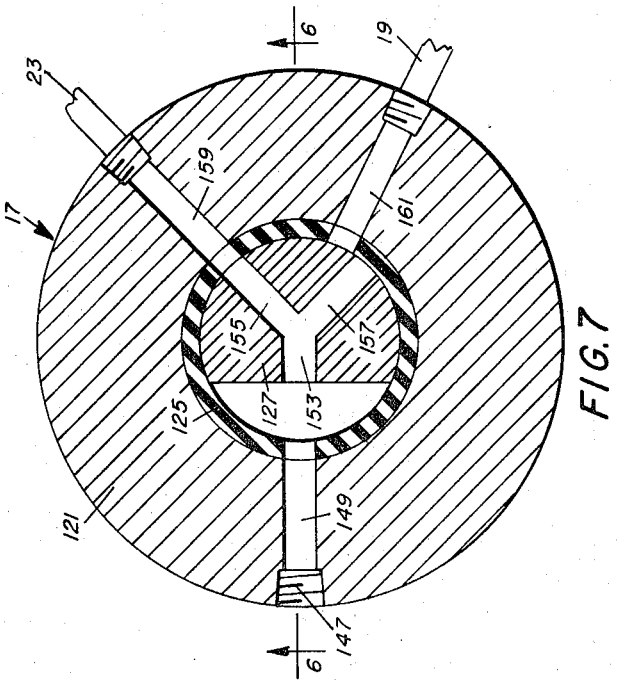
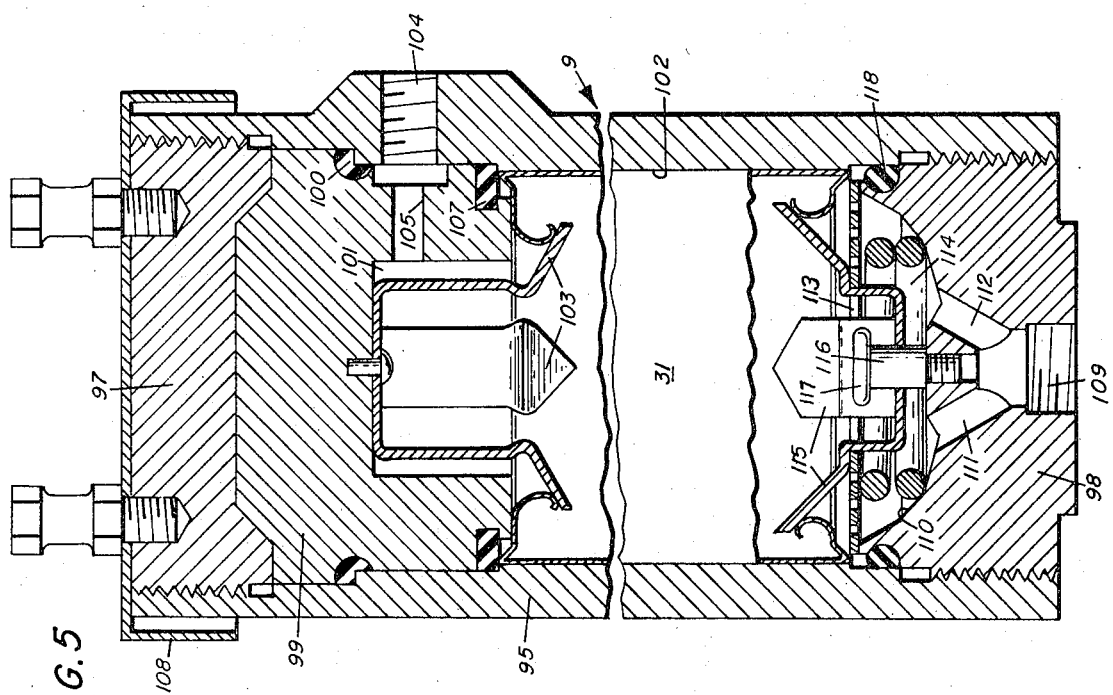
INVENTOR
EDUARD M. LUSTIG
BY
ATTORNEYS

United States Patent Office 3,555,787
Patented Jan. 19, 1971

3,555,787
AIR PURIFYING AND HUMIDITY CONTROL SYSTEM
Eduard M. Lustig, Fort Valley, Ga., assignor to Catalytic Engineering & Manufacturing Corporation, Fort Valley, Ga., a corporation of Georgia
Filed Aug. 26, 1968, Ser. No. 755,176
Int. Cl. B01d 53/04
U.S. Cl. 55—179                    6 Claims

ABSTRACT OF THE DISCLOSURE

A system for purifying compressed air or other gas including a mechanical filter for removing larger particles from the air and a series of chemical filters for removing water and oil vapors and molecular contaminants down to a diameter of two angstroms. The resultant air is ultradry, and unsuited for use in breathing apparatus and the like while in this condition. A proportioning valve channels a selected portion of the ultradry air to a saturator, and this water-laden air is then mixed with the remainder of the ultradry air to produce a resultant air stream having the desired moisture content. A special valve is provided to permit the accurate regulation of moisture content required.

BACKGROUND OF THE INVENTION

The present invention relates, in general, to systems for producing highly purified air, and more particularly to a system for purifying and controlling the moisture level in compressed air.

It is well recognized that the requirement for adequate supplies of fresh, clean air grows each year, as indicated by the increasing demand for air conditioning and treating units for office buildings, homes and the like. To meet this demand, and to meet the challenge posed by increasing air pollution, great strides have been made in the development of air filters of various types which are designed to remove dust and similar contaminants from the air. However, in addition to these areas where such treatment is useful and desirable, there are certain areas of use where the careful control of air purity and humidity level is essential, and in these areas the usual air filtration and treatment systems are entirely inadequate. One of these critical areas is in the provision of portable air supply systems for use by men functioning in adverse environmental conditions, such as underwater diving operations or in space programs. The air supplies used in such critical applications usually consist of pressure tanks filled with compressed air at pressures of 2,500 p.s.i.g. or more.

Although the necessity for purified air, or other gas such as oxygen, in portable breathing systems is generally recognized, it is not generally known what the effect of a contaminated air supply can be on a person who is using such a supply with any regularity, and the criticality of a highly pure supply is not recognized. Thus, it is not unusual to see a pressure tank for underwater breathing apparatus being filled with an old air compressor having, at best, a mechanical filter to remove the more obvious contamination from the air but providing no other air treatment. Further, even where the danger is recognized, no prior art systems have been provided which are capable of producing a truly safe supply of air, oxygen or the like.

For example, compressed air often contains small amounts of carbon monoxide; yet even minute quantities of carbon monoxide can cause death, for its combination with the hemoglobin of the blood is accumulative. Thus, a skin diver who spends several hours a day submerged is endangering his health unless some means are provided for removing carbon monoxide from his air supply. Such means are not generally available at the present. Desiccants such as activated carbon, activated alumina, and the like do not remove carbon monoxide; thus, the use of desiccators alone is insufficient to solve this problem.

In addition to carbon monoxide, a most dangerous contaminant commonly found in the pressurized air tanks used by divers is oil vapor. In any oil lubricated compressor, the heat of compression forces some of the lubricant into the vaporous state, and most of this vapor remains suspended in the air in the diver's tank. The amount of oil present may be very small, but when a diver breathes this oil contaminated air, the oil begins to coat the exterior of the lung cells. As the oil continues to coat the lung cells, the diver may develop emphesyma after prolonged periods of breathing this contaminated air, and this may lead to chemical or oil pneumonia, for which there is at present no cure. Compressor designs have been modified and refined many times in an attempt to eliminate the problem of oil vapor, and many newer units are quite successful in doing this. However, compressor manufacturers do not have control over their compressors once they are sold, and when such compressors are used carelessly, the problem of oil vapor again becomes serious. Attempts have been made to remove oil vapor through refrigeration of the air; but, although refrigeration will reduce the concentration of the vapor, it will not remove it entirely. Further, refrigeration will not remove carbon monoxide from the air. Another suggestion for eliminating oil vapor from compressed air is the use of a water lubricated compressor. Such a compressor would have carbon piston rings instead of the usual steel piston rings. However, such rings wear very fast, and in so doing inject minute carbon particles into the air stream. These carbon particles can irritate the diver's lungs and cause him to cough violently. Furthermore, they can accumulate in the lungs over a period of time and cause a situation similar to that of silicosis.

Another problem encountered in the use of high pressure sources of air is the fact that compressed air containing suspended water vapor, when allowed to escape through a small port, will soon produce ice which can block the flow of air. It therefore is clear that some method of controlling the amount of moisture must be provided in such a system; thus desiccant beds are often used in air supply systems. Practically every known desiccant has a greater affinity for moisture vapor than for anything else, and in the case of many such desiccants, oil vapor will pass through unmolested. Even the few desiccants which will remove hydrocarbons have a very high affinity for moisture vapor; therefore, in order to preserve the capacity of these oil removal desiccants, the air must be dried thoroughly before it passes through them. However, the extremely dry air resulting from the use of desiccators can also provide a danger to the unwary user, for ultradry air can cause serious damage to tissue. Each time the lungs are filled with ultradry air, it is like subjecting the cells of the lungs to a vacuum of high magnitude, for the air, in its effort to return to equilibrium, rapidly draws moisture and heat out of the cells of the lungs. With very dry air, cell walls may be ruptured and destroyed. Further, the irritation to the lungs caused by breathing such air can cause coughing, and violent coughing can cause the death of a submerged skin diver. Too little moisture can injure the person breathing the air, while too much moisture can cause freezing of air valves or the like; therefore, a carefully balanced system must be provided.

Although the foregoing discussion has been directed primarily to air supplies used by divers, it is apparent that sources of pure air are equally important in other fields.

For example, highly purified air is extremely beneficial in hospital operating suites, for by properly purifying the air, it becomes sterile and thus is useful for blanketing the area around an incision in a patient's body. With sterile air flowing over an incision, the presence of harmful microorganisms can be prevented, and by proper control of the moisture content of the air very beneficial effects can be obtained. The central air conditioning system equipped with various treating devices such as charcoal filters and ultraviolet lamps do not effectively provide the sterile atmosphere which may be obtained by the present invention. Sterile, purified air may also be used to drive modern air-driven dental drills to eliminate the injection of contaminants into the patient's mouth and into the air surrounding the patient.

Another use for purified ultradry gas or air is in the packaging and storage of food products or the like which are susceptible to deterioration by microorganisms or the like contaminants. The system of the present invention, in removing virtually all contaminants from the gas which it treats, thus becomes particularly useful in the packaging of all types of foods. However, it was found that when pure gases from the present system are used at atmospheric pressure in their ultradry state, before the addition of moisture, the contact of such gases with cellular matter such as meat or vegetables caused rupturing of the cell structure and consequent destruction of the food. It is believed that the cause of such destruction was that the extremely dry gases cause heat and moisture to be withdrawn from the core of the cells so rapidly that the cell walls ruptured. This is basically the same phenomenon that occurs within the lungs of a person breathing such air. Applicant has found, however, that if such ultradry gases are applied to cellular matter of this type under considerable pressure, there is no injury to the cells. Apparently, the high pressure caues the ultradry gases to penetrate the mass of the cell to progresively absorb the latent heat and moisture, rather than withdrawing such heat and moisture from the cell. The pressure, which is a function of the mass and density of the material being treated, thus preserves the integrity of the cellular structure. Meats, vegetables and other foods so treated by ultradry gases under high pressure may be stored for long periods of time without refrigeration.

At the present time, there is no system of air purification and sterilization which can remove virtually all of the contaminants from an air supply and which will assure proper moisture content for the resulting gas stream. Many attempts have been made to provide such a system, but none have been sufficiently compact, simple and easy to maintain to have reached any degree of acceptance or use. Further, even the most complex of prior systems have not been able to provide the results obtained by the system of the present invention.

SUMMARY OF THE INVENTION

It is therefore an object of the present invention to provide a gas purification and sterilization system which removes virtually all contaminants from the air and which controls to a very fine degree the relative humidity of the effluent air.

A further object of the invention is to provide an effective air purification system which may be installed between an air compressor and the point of use or storage of the compressed air to thereby improve the quality and safety of the compressed air and to enable it to be used with confidence.

An additional object of the invention is the provision of a system for producing ultradry pure air which may be used in breathing apparatus after the addition of a suitable amount of moisture, and ultradry pure gas which may be used in the treatment of fruits, vegetables, meats and other foods, and which may be used in other environments where contaminant-free gases are required.

The present system comprises a novel combination of filtering and treating elements which remove to an extremely fine degree all of the gaseous and solid contaminants in the air supplied by the compressor, including contaminants which were either present in the ambient air or introduced by the compressor itelf. The filtering system comprises a mechanical pre-filter and three cylinders connected in series, each of said cylinders carrying a replaceable cartridge containing one or more filtering and/or desiccant elements. These cartridges dry the air to a very high degree and remove virtually all contaminants. The gas so filtered is then fed to a saturator for introducing water vapor back into the dried and treated air in order to produce the required humidity level. A novel control valve proportions the amount of air passing through the saturator and the amount of air bypassing the saturator. This valve permits very close and accurate regulation of the amount of water vapor present in the final recombined air stream effluent from the system at the point of use or storage, and it is this combination of elements which produces the improved air supply of the present invention.

BRIEF DESCRIPTION OF THE DRAWINGS

The foregoing and additional objects, features and advantages of the present invention will be apparent from the following detailed description of a preferred embodiment thereof, taken in conjunction with the accompanying drawings, in which:

FIG. 5 is a cross-sectional view of one of the cylinders in which the air purification cartridges are installed;

FIG. 6 is a cross-sectional elevation of the saturator by-pass control valve; and FIG. 7 is a cross-sectional view of the saturator by-pass control valve taken along lines 7—7 of FIG. 6.

DETAILED DESCRIPTION OF A PREFERRED EMBODIMENT

Figure 1:
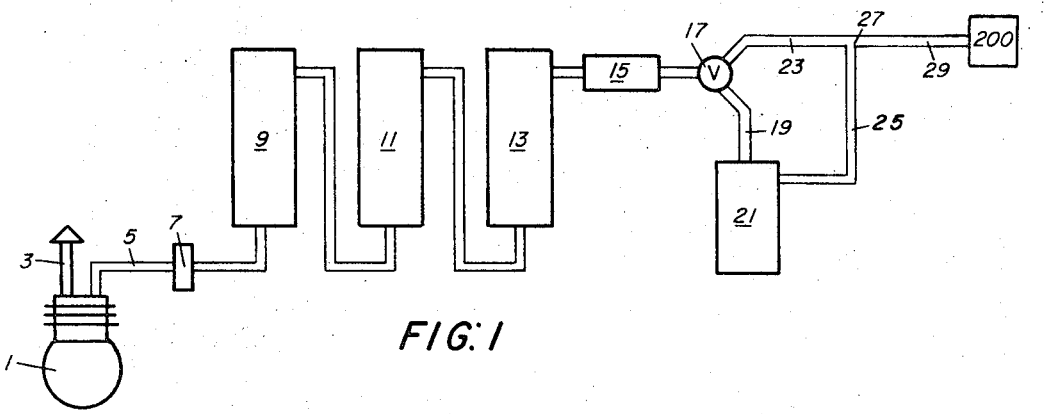
FIG. 1 is a diagrammatic view of the purification system of the invention.

Referring now to FIG. 1, air is drawn into the purification system by means of a conventional air compressor 1 through an air inlet 3. Compressed air from the compressor is discharged through line 5 to a mechanical filter 7 which removes the larger solid particles and oil droplets from the air. Although the present invention is described in terms of purification of air, it will be apparent that other gases such as oxygen may equally be cleaned by the present system.

The compressed air is then passed through a first air purification cylinder 9 and thence successively through a series of purification cylinders 11 and 13. The filter and dessicant cartridges contained in these three cylinders remove all contaminants from the compressed air stream and, as well, remove virtually all moisture therefrom. The compressed air then passes through an indicator 15, which may be either chemical or electronic, to measure continuously the concentration of various contaminants in the air stream so that the appropriate filter or desiccant cartridges may be replaced when any particular contaminant level approaches a predetermined value. From the indicator 15, the air passes to a saturator by-pass proportional control valve 17 which directs a selected portion of the air through line 19 to saturator 21, the remainder of the air by-passing the saturator by way of line 23. The water-laden air flowing out of the saturator passes through line 25, recombines with the by-pass air in line 23 at junction 27, and proceeds through line 29 to a point of use or storage.

The mechanical filter 7 may be of any known type which will serve to remove particulate matter from the air flow. Preferably, the filter will remove particles to a minimum size of 5 microns and will, as well, remove particles of oil and water and some of the vapor forms of each. The mechanical filter may easily be cleaned by reversing the direction of flow through it to back flush it, thus it would not normally need replacement. The filter may be provided with a sump for receiving water which is removed from the air stream, and this may be drained either manually or automatically, as desired.

Figure 2:
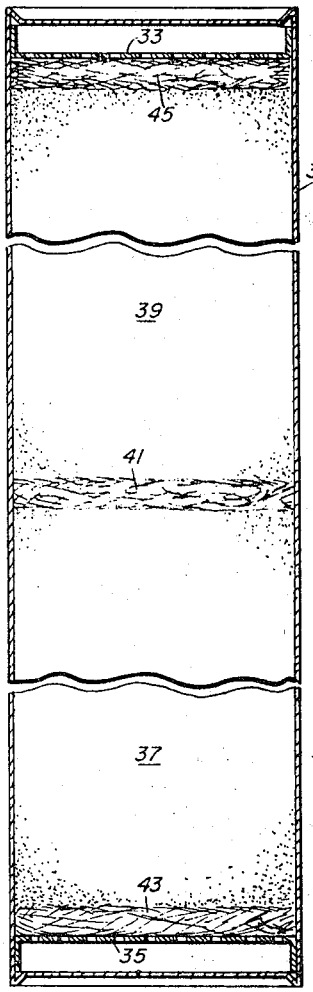
FIG. 2 is a partial cross-sectional view of the first cartridge through which the air from the compressor passes.

The filter and desiccant cartridges contained in cylinders 9, 11 and 13 preferably will be disposable cartridges containing inert, granular or pelletized chemical substances which perform the various functions in the purification process. FIG. 2 illustrates a cartridge suitable for use in cylinder 9. The cartridge comprises a metal or plastic cylinder 31 having end walls 33 and 35 at the top and bottom thereof. The end walls may be inset into the cylinder 31, as illustrated, and are sealed thereto to provide an air-tight cartridge. The end walls may then be perforated upon insertion of the cartridge into cylinder 9, for example by perforators located within the cylinder. Alternatively, the end walls may be provided with openings to permit the flow of air through the cartridge, with the sealing during storage being accomplished by a plastic cap, or the like, which may fit over the end of the cylinder.

The cartridge of FIG. 2 includes two filtering elements 37 and 39 which are separated from each other by an unbonded layer of glass fiber 41. The elements are also separated from their corresponding end walls by unbonded glass fiber pads 43 and 45, respectively. Filter element 37 is a desiccant bed which is comprised of a Linde molecular sieve type 4A-30, or its equivalent, which adsorbs water vapor from the compressed air to a dew-point temperature of about −100° F. and also removes the lighter fractions of hydrocarbons such as ethers, hexanes, heptanes, methanes and some carbon dioxide. Filter element 39 is a Linde molecular sieve type 5A, or its equivalent, which adsorbs molecules of hydrogen sulfide and sulfur dioxide, which are common contaminants introduced by a compressor operating at an elevated temperature. This filter adsorbs molecules with an effective diameter of less than 5 angstroms, and will also remove some additional water vapor.

Figure 3:
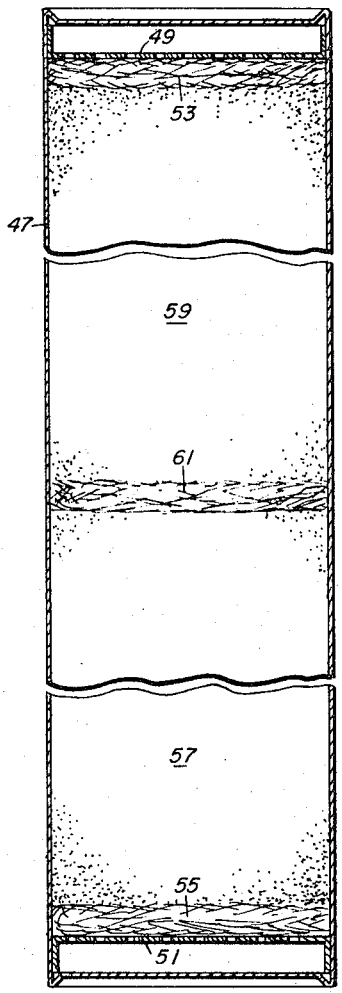
FIG. 3 is a partial cross-sectional view of the second cartridge through which the compressed air passes.

A cartridge for use in cylinder 11 of the air purification system is illustrated in partial cross-section in FIG. 3. This cartridge is constructed similarly to that of FIG. 2, having a cylindrical wall 47, end covers 49 and 51 and unbonded glass fiber pads 53 and 55 at the upper and lower ends, respectively. This cartridge, which treats air which has previously been treated by the cartridge in cylinder 9, contains a desiccant bed which may consist of a Linde molecular sieve type 13X. This desiccant bed may be a single filter element, or may comprise a pair of elements 57 and 59, separated by an unbonded glass fiber pad 61, as illustrated in FIG. 3. The Linde molecular sieve, or its equivalent, which is used in this cartridge adsorbs molecules with an effective diameter of less than 10 angstroms, including the larger hydrocarbon fractions and any residual water vapor in the compressed air. After removal of the heavier hydrocarbon molecules, the effluent air contains less than one part per million by volume of such molecules. The removal of residual water vapor reduces the effluent air to a dew-point temperature of approximately −175° F., or lower.

Figure 4:
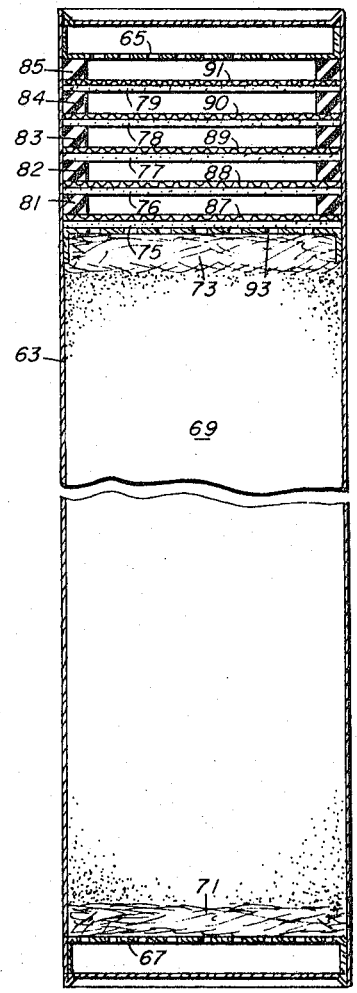
FIG. 4 is a partial cross-sectional view of the third cartridge through which the compressed air passes.

A cartridge for use in cylinder 13 is illustrated in partial section in FIG. 4. This cartridge, which receives air that has previously been treated by cylinders 9 and 11, is made up of cylindrical casing 63 and end caps 65 and 67, in the manner of the previously described cartridges. This cartridge contains a two-stage bed, the first of which is filter element 69 which is separated at the lower end from end cap 67 by glass fiber pad 71 and at the upper end from the remaining stages of the filter by unbonded glass fiber pad 73. Element 69 is a modified form of the "Purafil" filter which is marketed by Marbon Chemical Company. Purafil is manufactured by impregnating active alumina with potassium permanganate in aqueous solution and then regenerating it to its original state, using hot air to drive off excess water. The small amount of water remaining in the finished product (about 5.5 percent by weight) keeps the potassium permanganate active to chemically destroy odors by oxidation of the odor molecules. Since the air leaving cylinder 11 has been reduced to a dew-point temperature of about −175° F., extended exposure of the Purafil filter material to this low humidity air would reduce the residual moisture in the Purafil, thus imparing its odor molecule oxidizing capability. Therefore, for use in the system of the invention, the Purafil is modified by adding an additional 20 percent by weight of water. This modification is accomplished by passing air through a saturator which is held at a temperature of 135° F. to 145° F. and then passing the moist air through a bed of Purafil. The Purafil filter element is capable of removing a wide range of contaminants, including oxides such as carbon monoxide.

The final filtering element through which the air being processed passes is comprised of a plurality of discs 75–79 which are composed of Cambridge Absolute filter material. These filtering elements, which remove solid particles having a dimension of two angstroms or larger, are separated in cartridge 63 by a plurality of neoprene gaskets 81 to 85. Brass screens 87–91 are provided on the upper surfaces of discs 75–79, respectively. Separating the absolute filters from the Purafil filter bed 69 and glass fiber pad 73 is a perforated metal insert 93.

Referring now to FIG. 5, there is illustrated in greater detail the cylinders which are adapted to receive the cartridges illustrated in FIGS. 2, 3 and 4. Although FIG. 5 is a detailed illustration of cylinder 9, it will be understood that cylinders 11 and 13 are similar in structure. Cylinder 9 comprises a cylindrical housing 95 adapted to receive threaded upper and lower heads 97 and 98, respectively, which are adapted to be screwed into corresponding ends of the cylinder. Upper head 97 extends into the cylinder and is adapted to hold in place a sealing plate 99 which fits tightly within the housing and seals off the interior of the cylinder by means of O ring 100 which is pressed against a corresponding shoulder formed on the internal surface of the cylinder. The sealing plate has a centrally located, downwardly facing annular recess which forms an extension of the central recess 102. This recess is defined by the cylinder walls, the sealing plate 99 at the upper end and head 98 at the lower end of the cylinder. Recess 102 is adapted to receive cartridge 31 through which the air being treated is to flow.

Mounted in recess 101 is a perforator 103 which is designed to puncture the upper end of cartridge 31 as the cartridge is inserted into the cylinder. The holes so punctured permit air to flow from the cartridge into recess 101 and thence to the exterior of the cylinder by way of effluent air connection 104 which extends through the side of cylinder 95 and meets aperture 105 in the sealing plate 99. The air outlet 104 may be threaded or may have other suitable connector means for receiving an air line.

A flat gasket 107 is located on the lower surface of sealing plate 99 to receive the upper edge of cartridge 31. This gasket seals off the annular aperture formed around the cartridge after it is inserted in the cylinder, and prevents air from flowing around the outer surface of the cartridge. This insures that all the air flowing through cylinder 9 passes through cartridge 31. O ring 100 prevents air from escaping from cylinder 9. If desired, an overcap 108 may be provided for the cylinder to cover upper head 97, protecting the threads and preventing accidental loosening of the head.

Lower head 98, which screws into the lower end of cylinder 9, includes a threaded air inlet 109 for receiving gas to be treated. The lower head is formed with an upwardly directed, centrally located annular recess 110 into which air from inlet 109 enters by way of passages 111, 112. Covering the recess 110 is a perforated bottom support plate 113 which is adapted to fit against the bottom of cylinder 31. When head 98 is connected to the cylinder, this bottom support plate 113 is urged against the bottom of cylinder 30 of cartridge 31 by means of a heavy coil spring 114 located in recess 110 and extending from the bottom of the recess to plate 113. The bottom support plate 113 is held in place against coil spring 114 by means of lower perforators 115 which are movably fastened to lower head 98 by means of a post 116 which is threaded into the lower head. Post 116 includes an enlarged shoulder portion 117 which limits the upward motion of the perforators, and thus of the support plate, to retain the plate and spring in assembled relationship when the head 98 is removed from the cylinder for replacement of cartridge 31. O ring 118 is provided around the outer edge of head 98 to prevent the escape of compressed air from the cylinder. The various O rings and gaskets may be of neoprene or the like material which is capable of withstanding the high pressures generally used in air compressor systems.

When a new cartridge is placed in cylinder 95, insertion and tightening of head 98 causes the cartridge to be forced upwardly against perforators 103. As head 98 is tightened, perforators 103 puncture the upper end of the cartridge and perforators 115 puncture the lower end. Support plate 113 presses against the bottom of the cartridge and the pressure exerted by coil spring 114 insures that the upper end of the cartridge seats tightly against gasket 107. Perforators 115 are free to rotate about post 116 and thus may turn with respect to lower head 98 as the head is tightened. When the cartridge is seated in the cylinder, air flow through the cylinder is restricted to the path defined by the interior of the cartridge, thus insuring that all air is properly treated. For purposes of clarity, however, the filter material within cartridge 31 is not illustrated in FIG. 5.

Referring again to FIG. 1, the air from compressor 1, after having passed through mechanical filter 7 and each of cyinders 9, 11 and 13, is in an extremely clean and dry state, with a dew-point temperature of between —150° F. and —200° F. Air of this extreme dryness is often unsuitable for processes which require extremely clean air; for example, use of such dry air for breathing would be extremely hazardous to the user. Yet, it is necessary to remove this amount of moisture in order effectively to remove the contaminants contained in that same air. Restoration of moisture to this air is thus required before it can be used. To accomplish this, a proportional humidity control valve 17 directs a portion of the air stream to a saturator 21, where a maximum amount of distilled water is restored to this portion of the air flow. The saturated air is then recombined with the primary air stream, with the humidity of the resultant air stream depending upon the proportion of air flowing through saturator 21. By carefully regulating the amount of air diverted to the saturator, the humidity of the final air stream can be closely controlled. Through variation in the setting of regulator valve 17, the moisture content of the resultant air stream can be varied between the extremely dry condition of the effluent from canister 13 to a fully saturated condition.

The proportional control valve 17 is illustrated in section in FIGS. 6 and 7. The valve comprises a body portion 121 having a cylindrical aperture 123 lined with a Teflon sleeve 125. Rotatably mounted within the cylindrical aperture is a core 129 which is a section of a cylinder and adapted to slidably rotate in sleeve 125 about a vertical axis. Core 127 fits tightly within sleeve 125 and is mounted on and driven by means of axial shaft 129. The shaft is driven, in turn, by means of a spur gear 131 by way of a worm gear (not shown) mounted on the end of control shaft 133 which extends outwardly through the valve body 121 and terminates in a crank handle 135.

A pressure plate 137 is mounted within valve body 121 to cover aperture 123, with O rings 139 and 141 preventing air leakage out of the valve. A gear casing plate 143 covers spur gear 131 and is seated on pressure plate 137. The valve is then held in its assembled arrangement by means of a threaded plug 145 which may be tightened to transmit pressure through the gear casing plate and pressure plate 137 to compress O rings 139 and 141. Air enters the valve through threaded inlet opening 147 and passes through the valve housing and aperture 149 in the Teflon sleeve to reach a chamber 151 adjacent the inlet to the valve core 127.

Air passageways are provided within core 127 and comprise an inlet passage 153, a first outlet passage 155 and a second outlet passage 157, as best seen in FIG. 7. The valve housing 121 contains corresponding first and second air outlets 159 and 161. Corresponding passageways 155 and 159 and corresponding passageways 157 and 161 are so spaced that when the valve core 127 is in a first position, passageways 155 and 159 are aligned and passageways 157 and 161 are out of alignment so that all air flow through the valve is by way of 155 and 159. Rotation of valve core 127 in a counterclockwise direction as viewed in FIG. 7 will move passageway 155 slightly out of alignment with its corresponding passageway 159, but will move 157 toward alignment with 161. Rotation of the core 127 to its full counterclockwise position will result in full alignment of passageways 157 and 161 and complete nonalignment of passageways 155 and 159. Any position between the two extremes will result in the air flow through the valve being divided between passageways 159 and 161, the exact proportions depending upon the position of core 127. Thus it will be seen that air flow from chamber 151 will be through inlet passage 153 and passages 155 and 157 proportionally, depending upon the position of core 127 with respect to passageways 159 and 161. Effluent from valve body 121 will be by way of passageway 159, which may be connected to air line 23, for example, (see FIG. 1) by way of outlet 161, which may be connected, for example, to air line 19, or both.

The degree of precision with which the angular position of core 127 may be adjusted will depend upon the number of teeth and the pitch of the spur gear 131 and its associated driving worm gear mounted on shaft 133. It has been found that in one embodiment, 25 threads per inch on both the spur gear and the worm gear provide a satisfactory degree of control.

Returning now to FIG. 6, the shaft 129 extending upwardly from the rotatable core 127 is seen to pass through the threaded plug 145 and to project slightly above the upper surface of the valve housing. This shaft may be provided at its upper end with a pointer 165 which may indicate on a scale provided on indicator plate 167 the angular position of the rotatable core, providing the operator of the system with an external indication of the amount of air passing through the saturator and the amount of air being bypassed around the saturator. This indication will provide means for determining the humidity of the resultant air flow from the system, and, if desired, scale 117 may be arranged to give a direct reading of humidity.

The ultradry and highly purified air or gas which is produced by the above-described system has many uses, some of which have been alluded to. The proportional control valve which has been described permits a very high degree of accuracy in the regulation of the moisture content of the effluent gas, and this permits a wide range of uses for the system. One of the main uses for such gas is in the packaging and processing of raw and cooked foods for short or long term storage without the use of refrigeration or freezing. It is common knowledge that the presence of bacteria, mold, fungus spores and other contaminants are the cause of deterioration and spoilage of food, both cooked and raw. It is also known that the metabolic process continues in fruits and vegetables long after they have been harvested, and that this rapidly robs them of vitamin content as well as gradually changing their taste. By treating such foods with the ultradry pure gas obtained by the system of the present invention, the contaminants may be eliminated and the metabolic process stopped completely. This is accomplished by subjecting the foods to the inert gases produced by the present system under high pressure for the length of time required to achieve complete penetration of the gas into the food. The gas is held at such a pressure until all live organisms have been killed. The inert gas, which may be nitrogen, helium, or the like, must be very dry; i.e., with a dew point of about $-100°$ F., so that some of the moisture in the product will be eliminated.

Treatment of food products in this manner generally will be performed in a conventional autoclave or pressure vessel 200 adapted to handle air or gas of varying pressures. The processing will vary in accordance with the mass and density of the product. For example, potato chips and similar thin food products will require only low pressures, in the neighborhood of one atmosphere, and need be exposed to such an environment for a relatively short period of time at ambient temperature. With thicker products, the temperature must be raised a few degrees, the pressure must be higher, and the duration of exposure must be longer. The density of the product must also be considered in determining the environment for treatment; i.e., the combination of temperature, pressure and duration of exposure required for optimum results. For example, in the preparation of fruits and vegetables for long distance shipment, the product may be subject under pressure to an ultradry mixture of approximately 97% nitrogen and 3% carbon dioxide. The pressure may be as high as several thousand pounds per square inch for large, dense products. During processing, the ultradry gas slowly penetrates the product being treated, absorbing the latent heat without destroying the cell structure.

Previous methods of cooling vegetables to remove field heat have involved the application of cold, in the form of ice, brine or other refrigeration means to the outer surface of the product. Such prior methods have been unsuccessful in that such treatment accelerates the action of the enzymes in the outer layer of cells by drawing the heat to this outer layer from the core of the product. This rapid withdrawal of heat may damage the cells and, together with the increased enzyme action, conditions the product for early overripening and deterioration. The use of inert gases in the present method of treatment causes the oxygen in the cells of the product to be replaced by the nitrogen-carbon dioxide mixture, and the enzymes are deprived of oxygen, arresting the metabolic process. In addition, the ultradry gas mixture deionizes the liquid in the cells to make them inactive.

After treatment, the products may be packaged and hermetically sealed in an inert atmosphere. If the package provides a good vapor barrier, the product may be stored for an indefinite time without deterioration. Preferably, the product is packaged after treatment without exposing it to ambient atmosphere. When the vapor barrier is broken or removed, and the product is exposed to the atmosphere, it will slowly resume its full, normal metabolic activity.

The packaging and preservation of foods in this manner does not require the use of any additives or preservatives, but is based upon the elimination of living organisms, moisture and oxygen from the product and maintaining this condition by a sterile vapor barrier enclosure.

Although a preferred embodiment of the invention has been described, it will be apparent to those skilled in the art that numerous modification may be made without departing from the scope of the invention. For example, the threaded compressed air connections shown in the joints may be replaced by quick-connect fittings or any other conventional means for attaching a compressed air line or hose to a container. The specific structure of the filter cartridges may be modified; it is not essential that they be circular in cross section, although this is the most convenient configuration for high pressure devices, and it may be found that some other filter element separation member will function equally as well as the unbonded glass fiber pads disclosed herein. The cartridges themselves may be composed of metal, plastic or some other suitable material, while the pipelines and cylinders are preferably constructed of a suitable noncorrosive material which is capable of withstanding the high pressures involved.

The present system operates effectively to provide a supply of purified air of a degree not obtainable with any prior known system. The present system eliminates gaseous components such as carbon monoxide, hydrogen sulfide, and certain fractions of halogens and ethers, hexanes, heptanes, and methanes which are created in the heat of combustion in air compressors, and it is these components, existing in various quantities, which are the dangerous contaminants in air supply systems that are not removed by prior systems. In addition to removing these elements and solid particles, the present invention provides sterile air by removing bacteria and other microorganisms. Samples of air effluent from the present purification system, when injected into culture beds show no growth of microorganisms. The final, and one of the most important features of the present invention is the provision of a variable humidity control in the effluent gas, which feature makes it practical to provide the highly purified and sterile air produced by the series of desiccant beds and filters for use in breathing apparatus, food preservation and similar applications. Thus, the scope of the present invention is not limited to the specific embodiment illustrated, but includes the various alternatives and modifications that fall within the true spirit and scope of the invention as defined by the following claims.

I claim:
1. In combination, a gas purification and humidity control apparatus comprising:
  (a) a compressed gas source means having an outlet conduit;
  (b) a mechanical filter for removing particulate material having a diameter five microns or greater connected to said compressed gas source outlet conduit;
  (c) a first housing serially connected to said mechanical filter and containing a first adsorbent bed to adsorb water vapor from the gas to a dew point temperature of about $-100°$ F. and for adsorbing light fractions of hydrocarbons, and a second adsorbent bed for adsorbing molecules of hydrogen sulfide and sulfur dioxide;
  (d) a second housing serially connected with said first housing and containing an adsorbent bed for adsorbing heavy hydrocarbon molecules and for removing residue water vapor to reduce the dew point temperature of said gas to approximately $-170°$ F.;
  (e) a third housing serially connected with said second housing and containing an adsorbent bed, said third housing adsorbent bed having an adsorbent for removing odor molecules by oxidation and filter means for removing all solid particles having a diameter two angstroms or greater;
  (f) a saturator means having a housing including an inlet and outlet, said saturator means including means to add a predetermined amount of moisture to said ultradry gas passing from said third housing to control the humidity of the effluent gas expelled from said apparatus;
  (g) proportional valve having an inlet and a first and second outlet for regulating the amount of said purified and ultradry gas which is directed through said saturator means, said valve inlet being connected to said third housing downstream thereof, and said first valve outlet being connected to said saturator means housing inlet; and (h) a conduit having a first inlet and an outlet to atmosphere, said first inlet being connected to said second valve outlet and further including a connecting conduit, said connecting conduit being connected between said saturator means housing outlet and said conduit so that said saturated gas from said saturator means and said ultradry gas from said second valve outlet are combined into an effluent gas.

2. The apparatus of claim 1, wherein said proportional valve comprises:

(a) a housing having a cylindrical center opening, said valve inlet and first and second outlets communicating with said opening;

(b) valve core means rotatably mounted within said opening and adapted to be moved between a first position wherein said second inlet is closed and said first outlet is fully open, and a second position wherein said first outlet is closed and said second outlet is fully open, said valve core having intermediate positions wherein said first and second outlets are proportionally and partially open; and (c) a control and indicating means mounted on said valve housing for controlling and indicating the position of said valve core.

3. The apparatus of claim 1, wherein said compressed gas source is an air compressor and said effluent gas from said system is suitable for use in a breathing apparatus.

4. The gas purification and humidity control apparatus of claim 1, wherein said compressed gas source means is an inert gas source and further including means for applying said inert ultradry gas to foods, said means for applying said inert gas is connected to said conduit to receive the pressurized inert gas from said apparatus so that the foods can be preserved without refrigeration.

5. The apparatus of claim 4, wherein said means for applying said ultradry gas to foods is a gas tight container which is connected to said conduit to receive the pressurized inert gas from said apparatus.

6. The apparatus of claim 4, wherein said compressed inert gas source is an inert gas source approximately 97% nitrogen and approximately 3% carbon dioxide.

References Cited

UNITED STATES PATENTS

| | | | |
|---|---|---|---|
| 1,670,656 | 5/1928 | Fleisher | 261—RH |
| 1,838,506 | 12/1931 | Tinnerman | 251—248 |
| 2,017,779 | 10/1935 | Vosburgh | 55—68 |
| 2,208,443 | 7/1940 | Ashley | 55—35 |
| 2,398,830 | 4/1946 | Hamilton | 55—480 |
| 2,612,341 | 9/1952 | Bridgefield | 137—625.11 |
| 2,616,398 | 11/1952 | Emrick | 251—250 |
| 2,845,138 | 7/1958 | Gageby | 55—480 |
| 2,893,429 | 7/1959 | Schaffer | 137—625.41 |
| 2,944,627 | 7/1960 | Skarstrom | 55—179 |
| 2,953,215 | 9/1960 | Vaisala | 137—625.41 |
| 3,172,747 | 3/1965 | Nodolf | 55—387 |
| 3,242,651 | 3/1966 | Arnoldi | 55—75 |
| 3,395,511 | 8/1968 | Akerman | 55—316 |
| 3,421,837 | 1/1969 | Ebel et al. | 55—74 |
| 2,811,223 | 10/1957 | Newton | 62—92 |
| 3,067,522 | 12/1962 | Teigen | 62—90 |
| 3,119,239 | 1/1964 | Sylvan | 62—90 |
| 3,221,476 | 12/1965 | Meyer | 55—68 |
| 3,225,516 | 12/1965 | Smith et al. | 55—179 |
| 3,252,270 | 5/1966 | Pall et al. | 55—316 |

FOREIGN PATENTS

| | | | |
|---|---|---|---|
| 1,290,064 | 2/1962 | France | 137—625.41 |

OTHER REFERENCES

German patent application 1,082,210 dated May 25, 1960.

FRANK W. LUTTER, Primary Examiner

BERNARD NOZICK, Assistant Examiner

U.S. Cl. X.R.

55—261, 316, 350, 387, 389; 137—625.47